US012242493B2

United States Patent
Karanasos et al.

(10) Patent No.: US 12,242,493 B2
(45) Date of Patent: Mar. 4, 2025

(54) QUERY PROCESSING WITH MACHINE LEARNING

(71) Applicant: Microsoft Technology Licensing, LLC, Redmond, WA (US)

(72) Inventors: Konstantinos Karanasos, San Francisco, CA (US); Matteo Interlandi, Seattle, WA (US); Fotios Psallidas, Bellevue, WA (US); Rathijit Sen, Madison, WI (US); Kwanghyun Park, Hudson, OH (US); Ivan Popivanov, Redmond, WA (US); Subramaniam Venkatraman Krishnan, Santa Clara, CA (US); Markus Weimer, Kirkland, WA (US); Yuan Yu, Cupertino, CA (US); Raghunath Ramakrishnan, Bellevue, WA (US); Carlo Aldo Curino, Woodinville, WA (US); Doris Suiyi Xin, Berkeley, CA (US); Karla Jean Saur, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 975 days.

(21) Appl. No.: 16/990,506

(22) Filed: Aug. 11, 2020

(65) Prior Publication Data
US 2021/0124739 A1 Apr. 29, 2021

Related U.S. Application Data

(60) Provisional application No. 62/927,187, filed on Oct. 29, 2019.

(51) Int. Cl.
*G06F 16/2458* (2019.01)
*G06F 16/28* (2019.01)
(Continued)

(52) U.S. Cl.
CPC ........ *G06F 16/2458* (2019.01); *G06F 16/284* (2019.01); *G06N 5/04* (2013.01); *G06N 20/00* (2019.01)

(58) Field of Classification Search
CPC ..... G06F 16/2458; G06F 16/284; G06N 5/04; G06N 5/01; G06N 3/105; G06N 3/08; G06N 20/00
See application file for complete search history.

(56) References Cited

U.S. PATENT DOCUMENTS 11,797,876 B1 * 10/2023 Wang ................ G06N 3/0464
2016/0034530 A1 * 2/2016 Nguyen ............ G06F 16/24542
707/719
(Continued)

OTHER PUBLICATIONS

"Predicting Hospital Length of Stay", http://web.archive.org/web/20170625124538/https://microsoft.github.io/r-server-hospital-length-of-stay/, Jun. 25, 2017, 2 Pages. (Year: 2017).*
(Continued)

*Primary Examiner* — Matthew J Ellis
(74) *Attorney, Agent, or Firm* — Rainier Patents, P.S.

(57) ABSTRACT

The description relates to executing an inference query relative to a database management system, such as a relational database management system. In one example a trained machine learning model can be stored within the database management system. An inference query can be received that applies the trained machine learning model on data local to the database management system. Analysis can be performed on the inference query and the trained machine learning model to generate a unified intermediate representation of the inference query and the trained model. Cross optimization can be performed on the unified intermediate representation. Based upon the cross-optimization, a first portion of the unified intermediate representation to be executed by a database engine of the database management
(Continued)

system can be determined, and, a second portion of the unified intermediate representation to be executed by a machine learning runtime can be determined.

20 Claims, 11 Drawing Sheets

(51) Int. Cl.
  *G06N 5/04* (2023.01)
  *G06N 20/00* (2019.01)

(56) References Cited

U.S. PATENT DOCUMENTS

| | | | |
|---|---|---|---|
| 2017/0213156 A1* | 7/2017 | Hammond | G06F 8/31 |
| 2019/0065523 A1* | 2/2019 | Singh | G06N 5/01 |
| 2019/0102426 A1* | 4/2019 | Chaudhry | G06F 16/24547 |
| 2019/0378028 A1* | 12/2019 | Chaudhuri | G06N 5/048 |
| 2020/0133964 A1* | 4/2020 | Lee | G06F 16/355 |
| 2020/0193288 A1* | 6/2020 | Li | G06N 3/045 |
| 2021/0174238 A1* | 6/2021 | Song | G06N 20/00 |

OTHER PUBLICATIONS

Varian et al. 2014, "Big data: New tricks for econometrics", https://pubs.aeaweb.org/doi/pdf/10.1257%2Fjep.28.2.3 (Year: 2014).*
"Predicting Hospital Length of Stay", Retrieved from: http://web.archive.org/web/20170625124538/https://microsoft.github.io/r-server-hospital-length-of-stay/, Jun. 25, 2017, 2 Pages.
"Kaggle: The State of Data Science & Machine Learning", Retrieved from: https://web.archive.org/web/20191004171322/http://www.kaggle.com/surveys/2017, Oct. 4, 2019, 14 Pages.
"An Open Source Platform for the Machine Learning Lifecycle", Retrieved from: http://web.archive.org/web/20190114094959/https://mlflow.org/, Jan. 14, 2019, 4 Pages.
"MLflow Models", Retrieved from: http://web.archive.org/web/20191108214305/https://mlflow.org/docs/latest/models.html, Nov. 8, 2019, 19 Pages.
"Multi-Level Intermediate Representation" Compiler Infrastructure, Retrieved from: https://web.archive.org/web/20190817115239/https://github.com/tensorflow/mlir, Aug. 17, 2019, 3 Pages.
"NumPy", Retrieved from: http://web.archive.org/web/20191007160541/https://numpy.org/, Oct. 7, 2019, 3 Pages.
"Open Neural Network Exchange Format", Retrieved from: http://web.archive.org/web/20190906220131/https://onnx.ai/, Apr. 25, 2019, 4 Pages.
"ONNX Runtime", Retrieved from: http://web.archive.org/web/20190724223719/http://github.com/microsoft/onnxruntime, Jul. 24, 2019, 6 Pages.
"ONNXMLTools", Retrieved from: http://web.archive.org/web/20190419154913/http://github.com/onnx/onnxmltools, Apr. 19, 2019, 4 Pages.
"Pandas", Retrieved from: http:/web.archive.org/web/20191008043414/https://pandas.pydata.org/, Oct. 8, 2019, 4 Pages.
"The EU General Data Protection Regulation (GDPR) is the Most Important Change in Data Privacy Regulation in 20 Years", Retrieved from: https://web.archive.org/web/20191008042114/https://eugdpr.org/, Oct. 8, 2019, 3 Pages.
"PyTorch", Retrieved from: http://web.archive.org/web/20190924035520/https://pytorch.org/, Sep. 24, 2019, 3 Pages.
"Scikit-Learn", Retrieved from: http://web.archive.org/web/20191005094952/https://scikit-learn.org/stable/, Oct. 5, 2019, 3 Pages.
"TensorFlow Model Optimization", Retrieved from: http://web.archive.org/web/20191002091844/http://www.tensorflow.org/lite/performance/model_optimization, Oct. 2, 2019, 2 Pages.
"XLA: Optimizing Compiler for TensorFlow", Retrieved from: http://web.archive.org/web/20191008193922/https://www.tensorflow.org/xla/, Oct. 8, 2019, 6 Pages.
Abadi, et al., "Tensorflow: A System for Large-Scale Machine Learning", In Proceedings of the 12th USENIX Symposium on Operating Systems Design and Implementation, Nov. 2, 2016, pp. 265-283.
Aberger, et al., "Levelheaded: A Unified Engine for Business Intelligence and Linear Algebra Querying", In Proceedings of the IEEE 34th International Conference on Data Engineering, Apr. 16, 2018, pp. 449-460.
Ahmad, et al., "Automatically Leveraging MapReduce Frameworks for Data-Intensive Applications", In Proceedings of the International Conference on Management of Data, Jun. 10, 2018, pp. 1205-1220.
Ahmed, et al., "Machine Learning at Microsoft with ml.net", In Proceedings of the 25th ACM SIGKDD International Conference on Knowledge Discovery & Data Mining, Aug. 4, 2019, pp. 2448-2458.
Beeri, et al., "On the Power of Magic", In Proceedings of the 6th ACM Symposium on Principles of Database Systems, Jun. 1987, pp. 269-284.
Boehm, et al., "SystemML: Declarative Machine Learning on Spark", In Proceedings of the Very Large Database Endowment, vol. 9, Issue 13, Sep. 1, 2016, pp. 1425-1436.
Chen, et al., "TVM: An Automated End-to-End Optimizing Compiler for Deep Learning", In Proceedings of the 13th USENIX Symposium on Operating Systems Design and Implementation, Oct. 8, 2018, pp. 579-594.
Cranshaw, et al., "Clipper: A Low-Latency Online Prediction Serving System", In Proceedings of 14th USENIX Symposium on Networked Systems Design and Implementation, Mar. 27, 2017, pp. 613-627.
Hansen, et al., "PREDICT (Transact-SQL)", Retrieved from: https://docs.microsoft.com/en-us/sql/t-sql/queries/ predict-transact-sql?view=sql-server-2017, Oct. 24, 2019, 5 Pages.
Hansen, et al., "sp_execute_external_script (Transact-SQL)", Retrieved from: https://docs.microsoft.com/en-us/sql/relational-databases/system-stored-procedures/sp-execute-external-script-transact-sql?view=sql-server-2017, Nov. 4, 2019, 7 Pages.
Hellerstein, et al., "The MADlib Analytics Library or MAD Skills, the SQL", In Proceedings of the Very Large Database Endowment, vol. 5, Issue 12, Aug. 27, 2012, pp. 1700-1711.
Hutchison, et al., "LaraDB: A Minimalist Kernel for Linear and Relational Algebra Computation", In Proceedings of the 4th ACM Workshop on Algorithms and Systems for MapReduce and Beyond, May 19, 2017, 10 Pages.
Jankov, et al., "Declarative Recursive Computation on an RDBMS", In Proceedings of the Very Large Data Base Endowment, vol. 12, Issue 7, Mar. 1, 2019, pp. 822-835.
Karanasos, et al., "Extending Relational Query Processing with ML Inference", In Repository of arXiv, arXiv:1911.00231v1, Nov. 1, 2019, 6 Pages.
Kraft, et al., "Willump: A Statistically-Aware End-to-End Optimizer for Machine Learning Inference", In Repository of arXiv:1906.01974v2, Sep. 10, 2019, 12 Pages.
Kunft, et al., "An Intermediate Representation for Optimizing Machine Learning Pipelines", In Proceedings of the Very Large Database Endowment, vol. 12, Issue 11, Jul. 1, 2019, pp. 1553-1567.
Lee, et al., "From the Edge to the Cloud: Model Serving in ml.net", In Bulletin of the IEEE Computer Society Technical Committee on Data Engineering, vol. 41, Issue 4, Dec. 20, 2018, pp. 46-53.
Lee, et al., "Pretzel: Opening the Black Box of Machine Learning Prediction Serving Systems", In Proceedings of the 13th USENIX Symposium on Operating Systems Design and Implementation, Oct. 8, 2018, pp. 611-626.
Ramachandra, et al., "Froid: Optimization of Imperative Programs in a Relational Database", In Proceedings of the Very Large Database Endowment, vol. 11, Issue 4, Dec. 1, 2017, pp. 432-444.
Ray, et al., "What are SQL Server big Data Clusters?", Retrieved from: http://web.archive.org/web/20190709161407/https://docs.microsoft.com/en-us/sql/big-data-cluster/big-data-cluster-overview?view=sqlallproducts-allversions, Jun. 26, 2019, 5 Pages.
Schule, et al., "ML2SQL Compiling a Declarative Machine Learning Language to SQL and Python", In Proceedings of the 22nd International Conference on Extending Database Technology, Mar. 26, 2019, pp. 562-565.

(56) References Cited

OTHER PUBLICATIONS

"International Search Report and Written Opinion Issued in PCT Application No. PCT/US20/056738", Mailed Date: Mar. 2, 2021, 12 Pages.

* cited by examiner

QUERY PROCESSING WITH MACHINE LEARNING

PRIORITY

This utility application claims priority to US Provisional Patent Application 62/927,187 filed on Oct. 29, 2019, which is hereby incorporated by reference in its entirety.

BACKGROUND

Advances in machine learning (ML), first proven in high-value web applications, are fueling a trend towards digitally transforming almost every industry—in large part due to excitement around using ML to complement traditional data analysis, discover new insights, and amplify weak signals. Thus, machine learning has become increasingly integrated into enterprises.

SUMMARY

Described herein is a system for executing an inference query relative to a database management system (DBMS), such as a relational database management system (RDBMS). The relational database management system can include a processing system that can entail a processor and a memory having computer-executable instructions stored thereupon which, when executed by the processor, cause the processing system to perform acts. The acts can include receiving the inference query and applying a trained machine learning model on data local to the relational database management system. The inference query can entail one or more database operators, and, the trained machine learning model can entail one or more machine learning operators. The trained machine learning model can be stored within the relational database management system. The acts can also include performing static analysis of the inference query and the trained machine learning model to generate a unified intermediate representation (UIR) of the inference query and the trained model. The acts can also include performing cross-optimization of the unified intermediate representation based upon the one or more machine learning operators and the one or more database operators. The acts can also include determining a first portion of the unified intermediate representation to be executed by a database relational engine of the relational database management system, and, a second portion of the unified intermediate representation to be executed by a machine learning runtime that can be integral to the relational database management system. The acts can also include generating code for the database relational engine based upon the cross-optimization and determining a first portion of the unified intermediate representation, executing the generated code for the database relational engine using the database relational engine, and, executing the second portion of the unified intermediate representation using the machine learning runtime. The acts can also include providing a result to the inference query based upon execution of the first portion of the unified intermediate representation using the database relational engine, and, execution of the second portion of the unified intermediate representation using the machine learning runtime.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1A:
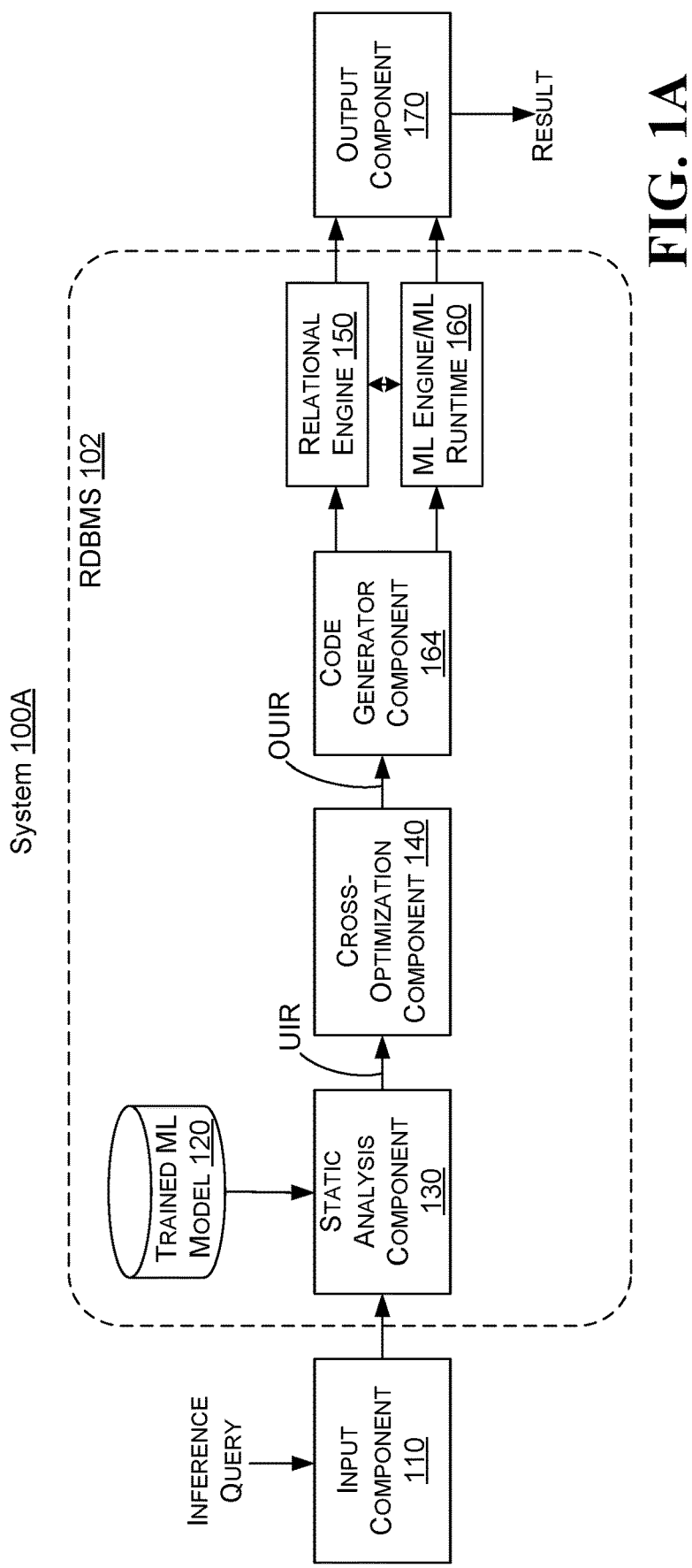
FIGS. 1A-1E show functional block diagrams that illustrate systems for executing an inference query with database management systems in accordance with some implementations of the present concepts.

Various technologies are described pertaining to executing an inference query with data from a database management system, such as a relational database management system. In the following description, for purposes of explanation, numerous specific details are set forth in order to provide a thorough understanding of one or more aspects. It may be evident, however, that such aspect(s) may be practiced without these specific details. In other instances, structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding executing an inference query. What follows are example systems and methods that can accomplish the present concepts.

Aspects of the subject disclosure pertain to the technical problem of efficiently executing an inference query. The technical features associated with addressing this problem involve receiving an inference query to apply a trained machine learning model on data local to a relational database management system. The inference query can comprise one or more database operators, and, the trained machine learning model can comprise one or more machine learning operators. The trained machine learning model can be stored within a relational database management system. Static analysis of the inference query and the trained machine learning model can generate a unified intermediate representation (UIR) of the inference query and the trained model. Cross optimization of the unified intermediate representation can be performed based upon the one or more machine learning operators and the one or more database operators. A first portion of the unified intermediate representation can be determined to be executed by a database relational engine of the relational database management system, and, a second portion of the UIR can be executed by a machine learning runtime integral to the relational database management system. Code can be generated for the database relational engine based upon the cross-optimization. The first portion of the unified intermediate representation can be determined by executing the generated code using the database relational engine. The second portion of the unified intermediate representation can be executed using the machine learning runtime. A result to the inference query can be provided based upon execution of the first portion of the unified intermediate representation using the database relational engine, and, execution of the second portion of the unified intermediate representation using the machine learning runtime.

From another perspective, the present solutions can answer the inference query using an integrated pipeline that can include machine learning operators and database operators so that machine learning is applied to aspects of the inference query that are effectively addressed (e.g., optimized) by machine learning and database techniques are applied to aspects that are effectively addressed (e.g., optimized) by database operators. Accordingly, aspects of these technical features exhibit technical effects of cross-optimization to more efficiently and effectively (and potentially optimally) execute inference queries. These aspects can reduce consumption of computer resource(s), such as storage, memory and/or processing cycles, reduce bandwidth usage, reduce latency, and/or provide more accurate query results and/or predictions.

As discussed above, advances in machine learning (ML), first proven in high-value web applications, are fueling a trend towards digitally transforming almost every industry—in large part due to excitement around using ML to complement traditional data analysis, discover new insights, and amplify weak signals. The database management service (DBMS), such as the relational database management system (RDBMS) can provide a starting point, given its mature infrastructure for fast data access and processing, along with support for enterprise features (e.g., encryption, auditing, high-availability).

Example implementations are described below for executing an inference query relating to data of a DBMS. A trained machine learning model can be stored with, or otherwise associated with, the DBMS. The trained model can include machine learning operator(s). An example use case scenario can involve receiving an example inference query. The trained machine learning model can be applied to the inference query, such as on data local to the database management system. The inference query can include database operator(s). The present concepts offer techniques to construct the unified intermediate representation (UIR) from the inference query. In some cases, the inference query can be received in a format (such as PyTorch, TensorFlow, or ONNX graph) that is readily convertible to the UIR. In other cases, a technique can be employed to facilitate the construction of the UIR from the inference query. One such technique is static analysis.

Static analysis can be employed when the inference query is expressed as generic code (like Python code, for example). Static analysis of the inference query and the trained machine learning model can be performed to generate the UIR of the inference query and the trained model. Cross optimization of the UIR can be performed based, at least in part, upon the machine learning operator(s) and/or the database (DB) operator(s). The cross-optimization can identify a first portion of the UIR that is efficiently handled (e.g., executed) by database operations and a second portion of the UIR that is efficiently handled (e.g., executed) by machine learning operations. Accordingly, the first portion of the UIR can be executed by the database engine. The second portion of the UIR can be executed by the machine learning engine (e.g., machine learning runtime). A result of the inference query can be provided based, at least in part, upon execution of the first portion of the unified intermediate representation using the database engine, and, execution of the second portion of the unified intermediate representation using the machine learning engine.

Some of the example systems and methods described herein can include an architecture for the native integration of machine learning inference runtimes (e.g., ONNX Runtime, TensorFlow, PyTorch, scikit-learn, etc.) to operate relative to an RDBMS (e.g., Microsoft's SQL Server, Oracle's relational database products, IBM's DB2, and Spark, among others). In some implementations, this can allow the system to support queries (e.g., SQL queries) that also perform model inference in an efficient manner and to also take advantage of the query optimizer (e.g., relational optimizer) of the RDBMS (e.g., SQL Server). In some cases, the machine learning operator(s) and/or the database (DB) operator(s) can be integrated within the RDBMS. This configuration can maintain data security since the data can be operated upon without being exported from the RDBMS. In other configurations, the machine learning operator(s) and/or the database (DB) operator(s) can occur outside of the RDBMS, such as a service that can operate on data in the RDBMS.

The systems and methods described herein can include a unified intermediate representation (UIR) to enable advanced cross-optimizations between machine learning and database operators. In some implementations, there are two main classes of optimizations: (i) transformations between different operator types (e.g., transform a database operator to a machine learning one and vice-versa), which allows the system to execute a given operator in different engines; (ii) information passing between machine learning operators and database operators to simplify the computation done by different parts of the inference query.

In some implementations, some of the systems described herein can leverage native integration of ML runtimes (e.g., Open Neural Network Exchange (ONNX) Runtime) within the relational database management system (e.g., SQL Server), and a unified intermediate representation (UIR) to enable advanced cross-optimizations between ML and DB operators. In some implementations, performance gains (e.g., of up to 5.5 times, for example) can be realized from the native integration of ML in the RDBMS. In some implementations, significant performance gains (e.g., of up to 24 times, for example) can be obtained from the cross-optimization(s) described below. Gains can also be achieved via the cross-optimizations between the ML and DB operators, regardless of the location. For instance, a cross-optimizer that enables cross-optimizations between the ML and DB operators can operate on data from the relational database management system, while being external to, or only partially contained within the RDBMS.

FIGS. 1A-1E show example systems 100A-100E respectively for accomplishing the present concepts. The use of the suffixes (e.g. 'A' of 100A) is intended to convey that the systems may include different elements/components and/or that like elements/components in the various systems may be different from one another (e.g., variations). Generally speaking the systems 100 can include and/or be communicatively associated with, an RDBMS 102, an input component 110, a trained ML model 120, a static analysis component 130, a cross-optimization component 140, a relational engine 150, a relational optimizer 154 (illustrated in FIG. 1B), an ML engine (also referred to as ML runtime) 160, a code generator component 164, and/or an output component 170, among others. Further, in the implementation of system 100C, some of these components are organized as a cross-optimization service 190 that is distinct from the RDBMS 102.

Figure 1B:
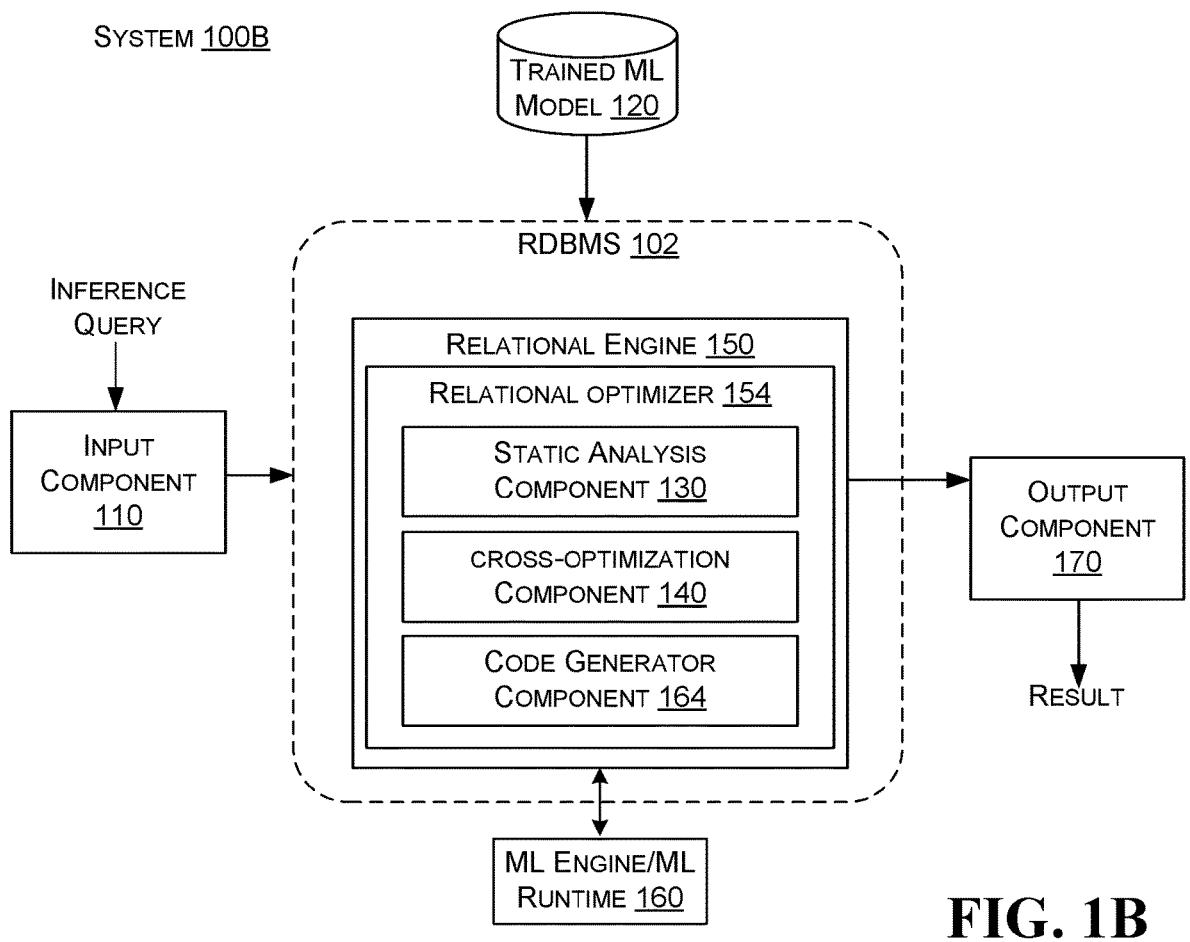
Figure 1C:
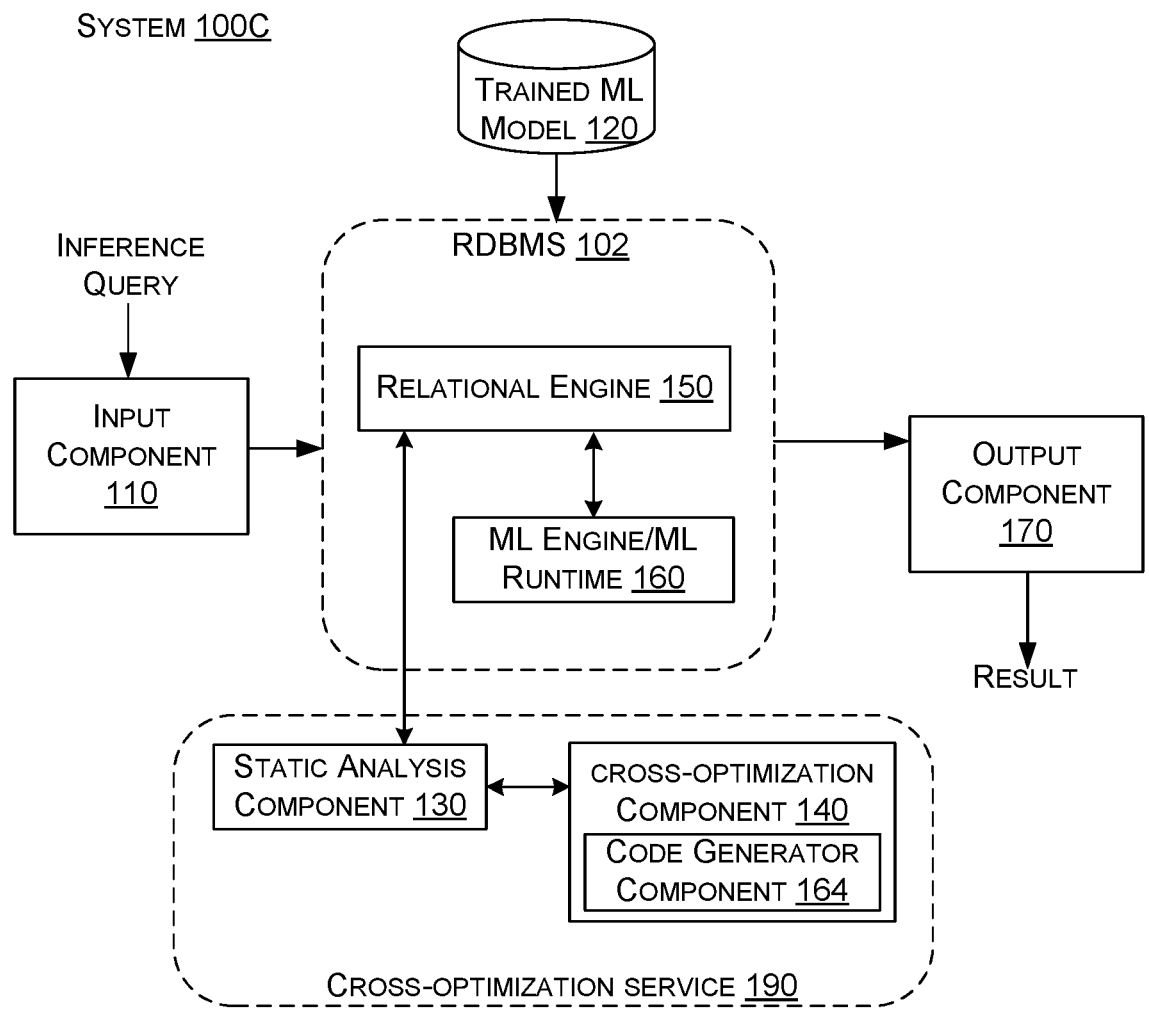
Figure 1D:
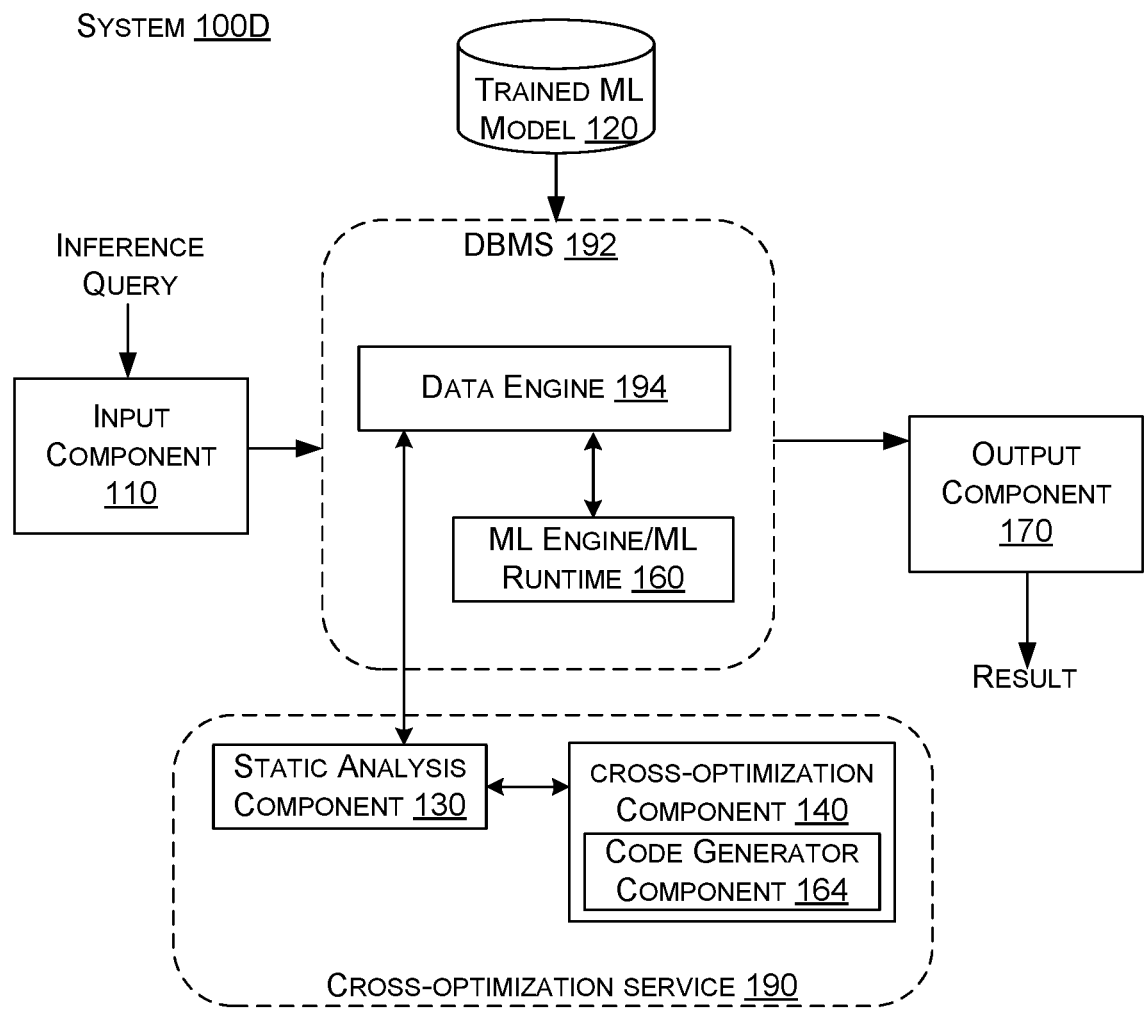
Figure 1E:
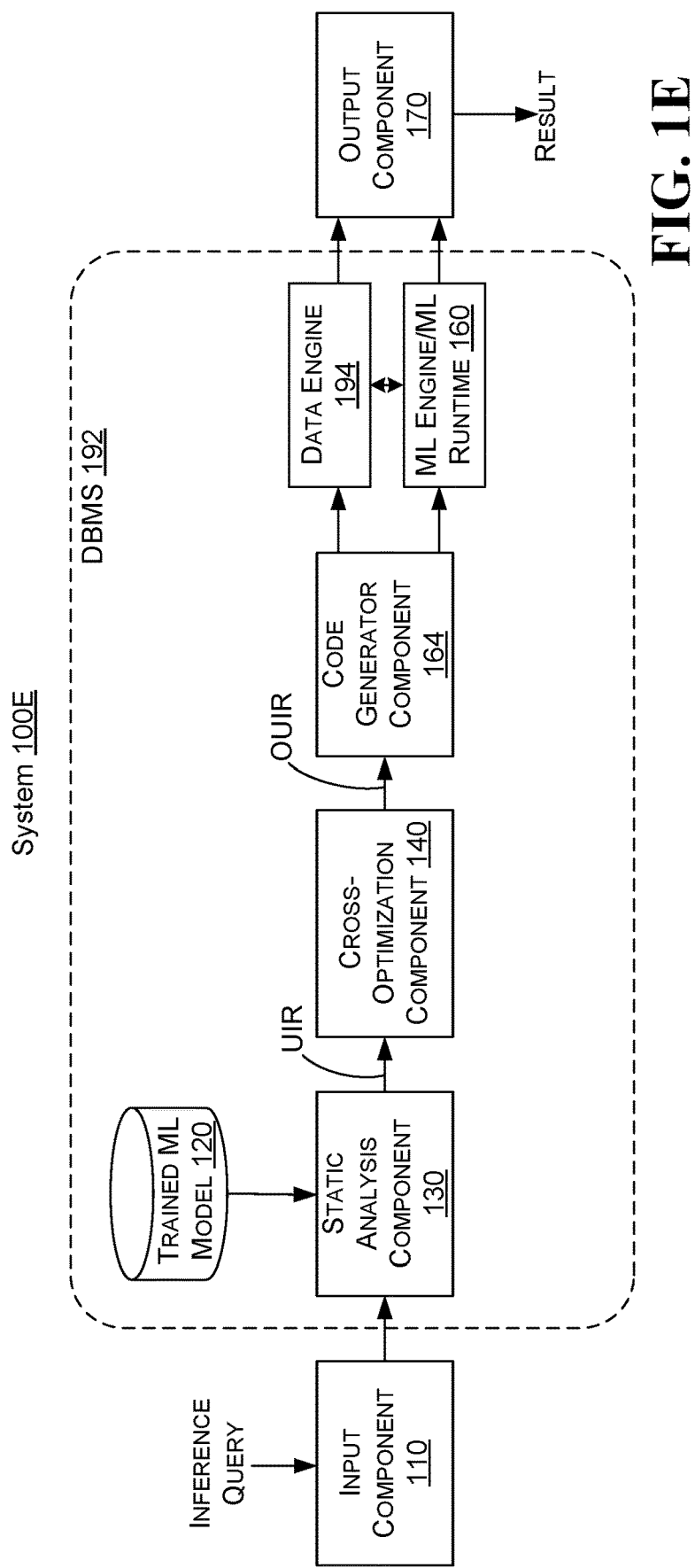

Further still, FIGS. 1D and 1E relate to database management systems (DBMSs) 192 that can entail RDBMSs 102 as well as other types of databases, such as large-scale distributed data platforms, streaming engines, or NoSQL (key-value, document, graph) databases. The DBMSs 192 can include a data engine 194 that can create, read, update and delete data, among other functions. Relational engine 150 of FIGS. 1A-1C can be viewed as a sub-set of data engine 194 of FIGS. 1D and 1E. Example data engines can include Spark, Hive, CosmosDB, Cassandra, and/or Flink, among other data engines.

Referring to FIG. 1A, example system 100A can execute an inference query within relational database management system 102. The relational database management system 102 can include or interact with input component 110 that receives the inference query. The relational database management system 102 can apply trained machine learning model 120 on data local to the relational database management system 102. The inference query can include one or more database operators, and, the trained model 120 can include one or more machine learning operators. In this implementation, the trained machine learning model 120 is stored within relational database management system 102.

The relational database management system 102 can further include static analysis component 130. The static analysis component can facilitate generation of the unified intermediate representation (UIR). In some cases, the machine learning model is in a form, such as a graph form, that readily lends itself to generation of the UIR. In other cases, the static analysis component can perform static analysis and/or other techniques on the query and the trained machine learning model 120 to generate the UIR of the inference query and the trained machine learning model 120. From one perspective, static analysis component 130 can be configured to perform static analysis. However, in many scenarios the static analysis component may be able to generate the UIR without employing static analysis. Thus, static analysis can be reserved for use on an 'as needed' basis rather than performed by default.

The relational database management system 102 can also include cross-optimization component 140 that performs cross-optimization of the unified intermediate representation based, at least in part, upon the one or more machine learning operators and the one or more database operators. The cross-optimization can produce an optimized unified intermediate representation (OUIR).

The OUIR can include a first portion of the unified intermediate representation to be executed by database relational engine 150 of the relational database management system 102, and, a second portion of the UIR to be executed by machine learning runtime 160 integral to the relational database management system 102.

Code generator component 164 can generate code relating to the first portion and/or the second portion. The code generation can entail generating new code (e.g., a new machine learning model or a new portion of a machine learning model). Alternatively, code generation can entail acquiring pre-existing code, such as from a library.

Within relational database management system 102, the database relational engine 150 can operate on the first portion, such as by executing code relating to the first portion. The machine learning runtime 160 can execute on the second portion of the unified intermediate representation, such as by executing code from the code generation component 164.

The relational database management system 102 can further include output component 170 that can provide a result to the inference query based, at least in part, upon execution of the first portion by the database relational engine 150 and the execution of the second portion by the machine learning runtime 160. The result can be utilized for various purposes, such as to control a computer or other device and/or to provide new and useful information for presentation to a user, such as the user that entered the inference query.

FIG. 1B shows system 100B that is similar to system 100A and thus not all elements are re-introduced for sake of brevity. In this case, the static analysis component 130, cross-optimization component 140, and the code generation component 164 are part of the relational engine 150. Specifically, in this implementation, the relational engine 150 includes relational optimizer 154. The relational optimizer 154 can include the static analysis component 130, cross-optimization component 140, and the code generation component 164. This can enhance the traditional functionality offered by the relational optimizer 154 and can allow the relational optimizer to decide which portions of the inference query should be handled using relational operations and which portions should be handled using ML operations. In this case, the ML engine 160 is located outside the RDBMS 102. The relational optimizer 154 can call the ML engine 160 based upon its (e.g., the relational optimizer's) determination how to handle the inference query.

FIG. 1C shows system 100C that is similar to systems 100A and 100B and thus not all elements are re-introduced for sake of brevity. In this case, cross-optimization is provided as a cross-optimization service 190. The cross-optimization service 190 can be available to any client that could benefit from the advantages offered by cross-optimization. In this case, the cross-optimization service 190 is engaged by the RDBMS's relational engine 150. The relational engine 150 can communicate with the cross-optimization service 190 to learn which portions of the inference query should be handled by the relational engine and which portions should be handled by the ML engine 160. The relational engine 150 can communicate appropriate portions to the ML engine 160 for execution and handle the other portions.

In this configuration, the cross-optimization service 190 includes the static analysis component 130 and the cross-optimization component 140. The cross-optimization component 140 can include and/or communicate with the code generator component 164.

FIG. 1D is similar to FIG. 1C. In this case, a database management service (DBMS) 192 is employed. The DBMS 192 can be an RDBMS 102 or another type of database system, such as a non-relational database system (e.g., NoSQL) or a distributed DBMS. Continuing with various implementation, the DBMS 192 can be any large-scale data platforms (Spark, Hive, Hadoop, etc.) and distributed DBMS (Microsoft SQL DW, Amazon Redshift, Google BigQuery, etc.), in some implementations. Further examples can include, Amazon DynamoDB, IBM Cloudant, Neo4j, Cache, Google Cloud Datastore, Oracle Berkeley DB, Amazon ElastiCache, Titan, Amazon Simple DB, Teradata Aster Database, IBM IMS, Sparksee, db4o, Clipper, /or Tamino, among others. The DBMS 192 can include a data engine 194 that can interact with the cross-optimization service 190 and the ML engine 160 to generate results for the inference query.

FIG. 1E is similar to FIG. 1A. In this case, database management service (DBMS) 192 is employed that includes data engine 194 that can interact with the cross-optimization service 190 and the ML engine 160 to generate results for the inference query.

FIGS. 1D and 1E illustrate that the present concepts can optimize inference queries relating to any type of database scenario by cross-optimization so that portions of the inference query are handled by database operators and other portions are handled by ML operators.

Example Inference Query

Safely and effectively adopting ML in enterprise settings can come with many new challenges across model training, tracking, deployment, and/or inference. As more and more data is analyzed and monetized, concerns about securing sensitive data and risks to individual privacy have been growing considerably with these concerns extended to ML models. In some scenarios, storage and/or inference of ML model(s) are subject to similar scrutiny and/or performance requirement(s), for example, of sensitive/mission-critical operational data.

When it comes to data, database management systems (DBMSs) have been the trusted repositories for the enterprise, as DBMSs provide fast data access and processing, as well as a mature infrastructure that delivers features such as rich connectivity, transactions, versioning, security, auditing, high-availability, and/or application/tool integration. In some implementations, the system 100 stores and/or serves ML model(s) (e.g., trained machine learning model(s) 120) from within the DBMS, such as RDBMS 102 in order to extend the above described feature(s) to models (e.g., trained machine learning model(s) 120) as well as data.

Additionally, with respect to inference of ML models, many model families can be uniformly represented. Given a particular ML model on a given input (e.g., inference query), the model can be expressed for scoring purposes using an appropriate algebraic structure. In some implementations, these algebraic structures can then be executed on different environments and hardware. In some implementations, ONNX is employed to represent the ML model. ONNX is an open format to standardize ML model representation in an engine-agnostic manner, similar to the role of relational algebra in RDBMSs. The system 100 can incorporate ML scoring as a foundational extension of relational algebra, and an integral part of RDBMS query optimizers and runtimes.

In some implementations, the system 100 supports in-database model inference and leverages sophisticated cross-optimizations and tight integration of ML runtimes in the DB (e.g., to outperform common practical solutions by up to 24 times, for example). In this manner, users (e.g., data scientists) can design and train ML models with their favorite ML framework. Once trained, these models, combined with any required data preprocessing steps and library dependencies, can form a model pipeline. In some implementations, the system 100 can support model pipelines expressed in a generic and portable model format that is compatible with MLflow, and store the model in the RDBMS 102 or the DBMS 192. Users can then invoke the model(s) (e.g., on data stored in the DB and/or on fresh data coming from an application) by issuing query command(s) (e.g., SQL commands). A query invoking a model pipeline can be referred to as an "inference query".

As mentioned above, the system 100 can utilize a unified intermediate representation (UIR) that includes both ML and relational operators. Input inference queries can be captured in this UIR by the static analysis component 130. The UIR is then analyzed and optimized by the cross-optimization component 140 using cross-operator optimization(s) and/or transformation(s). Finally, the optimized UIR (OUIR) can be fed for execution to the DBMS 192 or RDBMS 102 that can support one or more ML runtimes 160.

In some implementations, ML runtime engine 160 (e.g., ONNX runtime) is integral to the RDBMS/DBMS, that is, the ML runtime engine is native to the RDBMS/DBMS. In some implementations, in instances in which native execution of a particular ML pipeline is not provided within the RDBMS/DBMS, out-of-process and containerized execution can be utilized.

For purposes of explanation and not limitation, an example inference query for predicting the duration of a stay in a hospital will be discussed. In this example, a data scientist has developed a decision tree model M that predicts a patient's length of stay in a hospital, by combining "patient_info" with results from "blood_tests" and "prenatal_tests" as set forth in Table 1:

TABLE 1

INSERT INTO model (name, model) AS
("duration_of_stay",
"from sklearn.pipeline import Pipeline
from sklearn.preprocessing import StandardScaler
from sklearn.tree import DecisionTreeClassifier
from ...
model_pipeline =
Pipeline([('union', FeatureUnion(...
 ('scaler',StandardScaler()), ...))
 ('clf',DecisionTreeClassifier())])");

The model has been trained over large amounts of data (e.g., across all hospitals in an insurance network) and can be deployed/stored within the DBMS/RDBMS. At a later time, an analyst, employed by a specific hospital, issues a SQL query Q to apply the model M on local data in order to "find pregnant patients with a high likelihood of staying in the hospital for more than a week" and inform the medical staff.

In this example, by storing and scoring the model M within the RDBMS, ease of access via SQL can be inherited along with several desirable properties regarding updates to the deployed model: transactionality (a change to the model is handled as part of a transaction), high-availability, and/or auditability. In the configuration of FIG. 1A, the system 100A can employ one or more optimizations and then perform inference natively within the RDBMS 102 invoking the ML runtime 160 as an integral part of the RDBMS 102 (e.g., database runtime).

An input inference query QM, which includes both the SQL query Q and the model pipeline M (in Python here) set forth in Table 2:

TABLE 2

DECLARE @model varbinary(max) = (
 SELECT model FROM scoring_models
 WHERE model_name = "duration_of_stay");
WITH data AS(
 SELECT *
 FROM patient_info AS pi
 JOIN blood_tests AS be ON pi.id = be.id
 JOIN prenatal_tests AS pt ON be.id = pt.id TABLE 2-continued

```
);
SELECT d.id, p.length_of_stay
FROM PREDICT(MODEL=@model, DATA=data AS d)
WITH(length_of_stay Pred float) AS p
WHERE d.pregnant = 1 AND p.length_of_stay > 7;
```

The inference query QM can be handled by the system 100 as follows. First, the inference query QM can be received by the input component 110. The static analysis component 130 can parse the inference query QM and perform static analysis on the inference query QM (e.g., SQL script) and M (e.g., Python script). In this example, M is the trained machine learning model 120.

Figure 2:
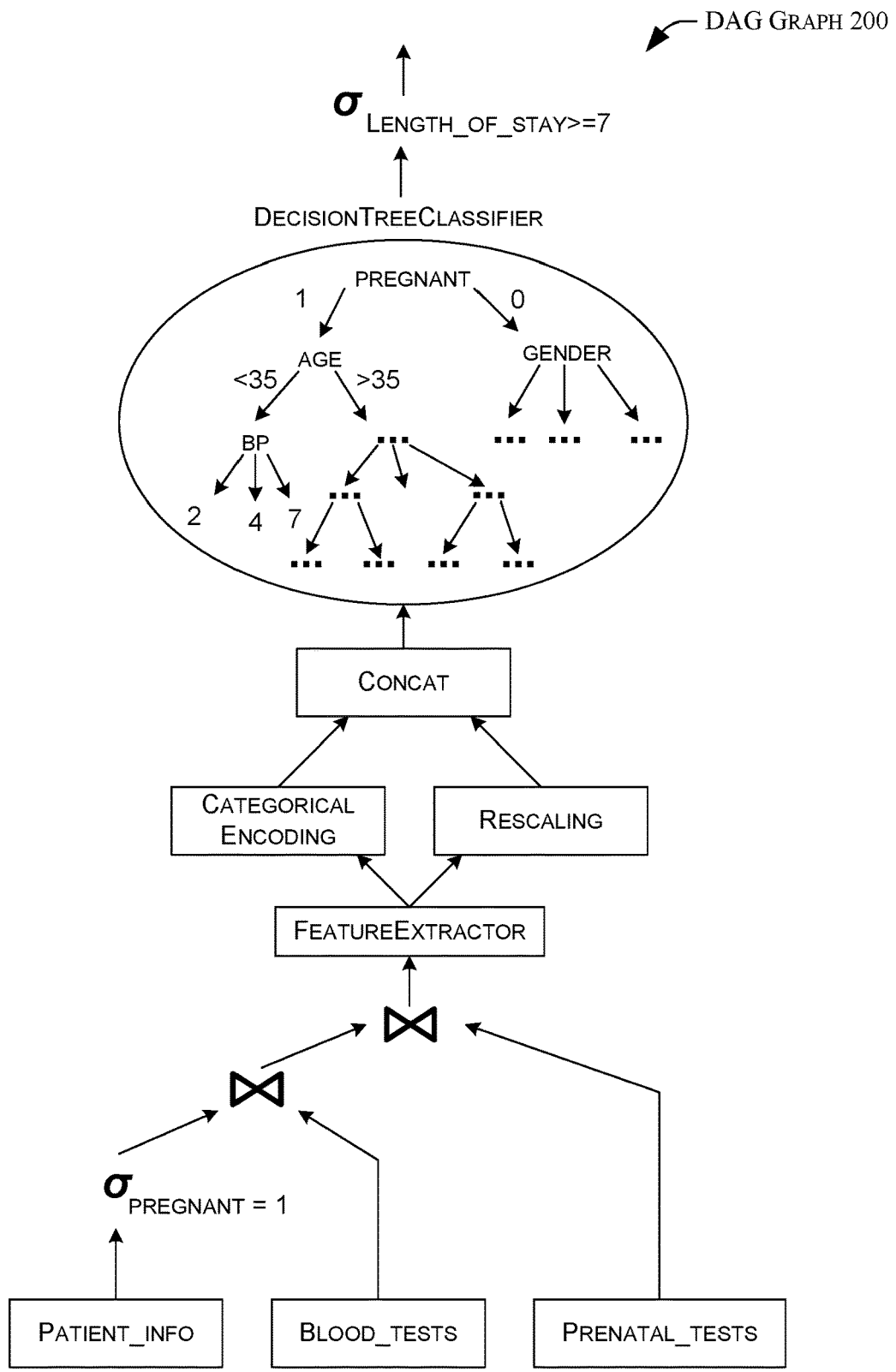
FIG. 2 is a diagram of an example directed acyclic graph in accordance with some implementations of the present concepts.

In some implementations, the result of the static analysis component 130 can be a directed acyclic graph (DAG) expressed in a UIR. Referring briefly to FIG. 2, an exemplary DAG graph 200 for an inference query QM and a trained machine learning model M is illustrated.

The UIR generated by the static analysis component 130 can be provided to the cross-optimization component 140 which can perform optimization(s) (e.g., passing information between the data operator(s) and the ML operator(s)) and/or operator transformation(s). The cross-optimization component 140 can further determine which part of the UIR will be executed by SQL Server (e.g., database relational engine 150) and which by the integrated machine learning runtime 160 (e.g., ONNX runtime, among others).

The cross-optimization component 140 can perform one or more optimizations. For purposes of explanation and not limitation, several optimizations as applied to this example are discussed:

- predicate-based model pruning: the condition pregnant=1 is pushed upward and into the decision tree, resulting in the right subtree (e.g., condition present not equal to 1) being pruned. model-projection pushdown: unused and/or zero-weight feature(s) can be projected-out early in the query plan—this can be common due to model regularization and/or due to the above pruning (e.g., gender is no longer used).
- model/query splitting: the pruned model can be partitioned in a cheap model (for age<=35) and a more complex one (for age>35). Thus, the model and query can be split in two branches and separately optimized.
- model inlining: small decision trees can be inlined utilizing SQL Server's UDF inlining feature.
- NN translation: the system 100 can transform many classical ML models (e.g., decision tree) and featurizers into equivalent neural networks (NN) to then leverage the highly optimized ONNX Runtime for batch scoring on CPU/GPU.
- standard database optimization(s): such as predicate/projection push-down and join elimination can be triggered—in the inlined left-branch doesn't need to be joined with prenatal_tests, and bp>140 can be derived and pushed-down.
- compiler optimizations: compiler-style optimizations such as constant-folding within can be implemented in ONNX Runtime—the pregnant variable is a constant in the example query and can be propagated inside the NN.

Figure 3:
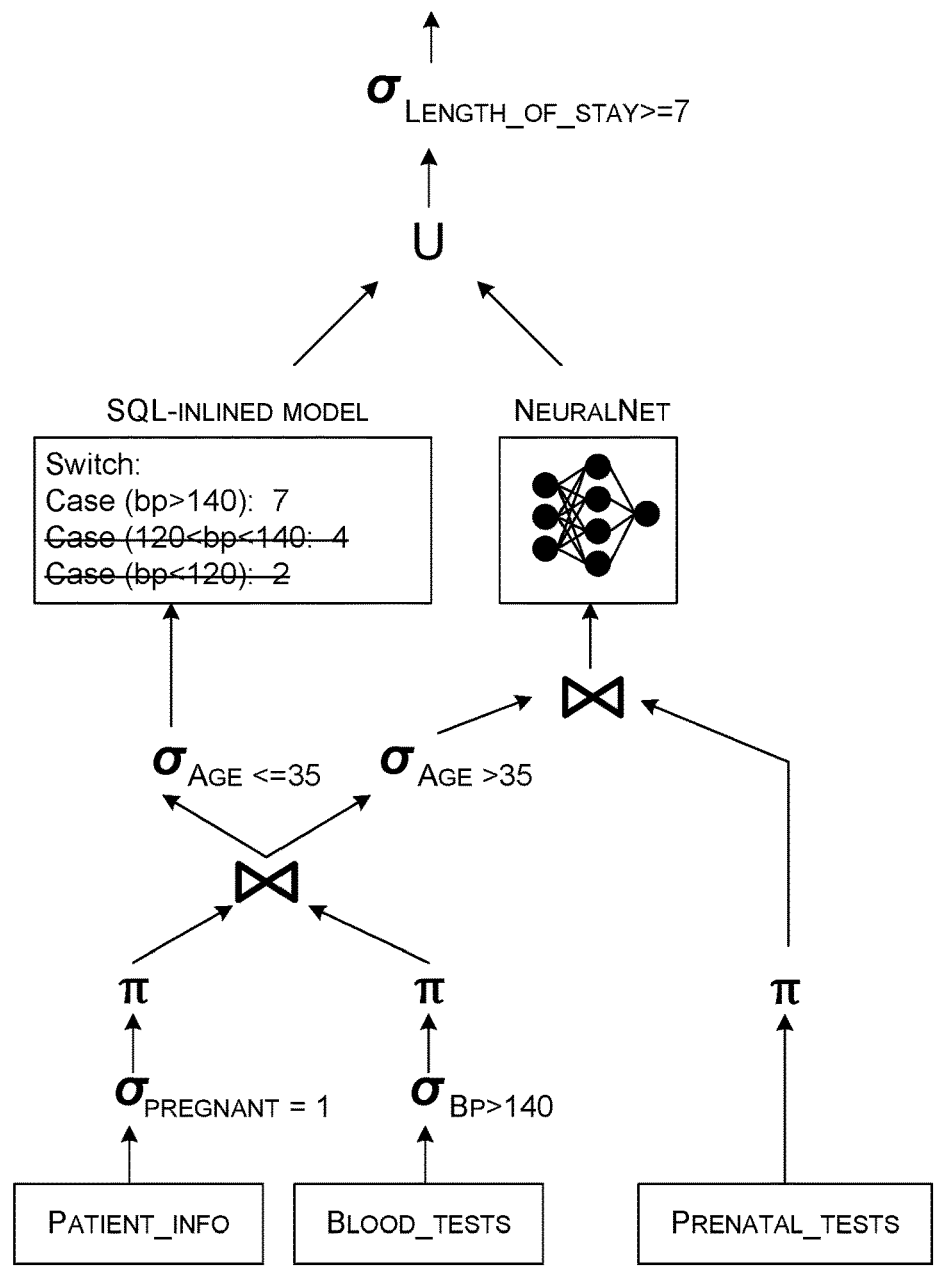
FIG. 3 is a diagram of an example optimized plan for an inference query in accordance with some implementations of the present concepts.

Turning briefly to FIG. 3, a diagram 300 of an example optimized plan for inference query QM is illustrated. The optimized UIR (OUIR) can be passed to the code generator component 164 which can generate a new SQL query (e.g., reflecting the above optimization(s)). In some implementations, the relational database engine 150 and the ML runtime 160 (e.g., integrated ONNX runtime engine integrated with SQL Server) can be invoked for execution. In some implementations, extensive optimizations are possible by bringing ML inference into the DBMS. In other cases, efficiencies can be achieved through cross-optimization without regard for the location of the ML engine 160.

UIR and Static Analysis

In some implementations, the system 100 combines both data operators and ML operators in a UIR. In this manner an inference query which includes both data operator(s) and ML operator(s) can be optimized in a holistic manner. That is, the system 100 can perform optimizations that span data and ML operations, and select the most suitable runtime to execute each operator.

In some implementations, data and ML operators can be chosen to cover most practical scenarios, and, can be extensible. An example operator set includes one or more of the following categories.

- Relational algebra (RA). This can include the relational algebra operators, which are found in a typical RDBMS.
- Linear Algebra (LA). A large fraction of the operators used in ML frameworks, and in particular neural network runtimes, fall into this category. Examples include matrix multiplication and convolution operators.
- Other ML operators and data featurizers (MLD). These operators are widely used in classical (non-NN) ML frameworks (e.g., scikit-learn), ML.NET, but do not fall in the LA category, such as decision trees and featurization operations (e.g., categorical encoding, text featurization).
- User-Defined Function(s) (UDFs). When the static analysis component 130 is not able to map part of the input into operators of the above categories (e.g., a function containing arbitrary Python code), a UDF operator can be used to wrap the non-optimizable code as a black box.

Note that in some implementations, the UIR can include both higher-level and lower-level operators. For example, a linear regression operator (higher-level) can also be expressed as a set of linear algebra operators (lower-level). This can allow diverse operator levels to unlock different optimizations.

Static Analysis

In some implementations, an inference query consumed by the system 100, as discussed above, can be a SQL query that performs (part of) the data processing and invokes ML model pipeline(s). The whole inference query can be instead expressed as a script in an imperative language (e.g., Python or R). In some implementations, the input script(s) can be accompanied by metadata to specify the required runtimes and dependencies (e.g., Python version, libraries used), and to access the referenced data and models. An open model format (e.g., such as the one defined in MLFlow), can be used for this purpose.

Translating the SQL part into the UIR can be straightforward (e.g., similar to a database parser that builds a logical plan). Significantly, the model scripts (e.g., Python script(s) and notebook(s)) expressed in an imperative language can be analyzed.

For example, given a particular Python script, the static analysis component 130 can perform lexing, parsing, extraction of variables and their scopes, semantic analysis, type inference, and finally extraction of control and data flows. In some implementations, to compile the dataflow to an equivalent UIR plan, the static analysis component 130 can take as input an in-house knowledge base of APIs of popular data science libraries, along with functions that map dataflow nodes/subgraphs to equivalent UIR operators. Dataflow parts that cannot be translated to UIR operators can be translated to UDFs.

In some implementations, this static analysis process can come with several challenges and limitations (again, the system 100 can use UDFs when the challenges/limitations cannot overcome them). First, translating loops to relational or linear algebra operators can entail difficult, if not undecidable, problems. However, in some implementations, the vast majority of cases can be handled through analysis of straight line code blocks. Second, conditionals result in potentially multiple execution paths. In such cases, the static analysis component 130 can extract one plan per execution path. Hence, in some implementations, downstream components of the system 100 can operate based on multiple plans. Third, in dynamically typed languages, such as Python, type inference can result in assigning a collection of potential types to variables. In some implementations, knowledge from the SQL part can be employed to improve type inference in many practical scenarios.

Cross Optimization

In some implementations, the cross-optimization component 140 can perform cross-IR optimizations that pass information between data and ML operators, and/or transformations between operators to allow more efficient engines to be used for the same operation. The optimizations can be expressed as transformation rules, applied by the cross-optimization component 140.

With respect to optimization, benefits can be evaluated. For example, two datasets: (i) patient information to predict length of stay in hospital (as discussed above); (ii) flight information to predict whether a flight will be delayed.

Cross-IR Optimizations

In this set of optimizations, ML operator characteristics (e.g., model weights) can be exploited to optimize data operations of the inference query (model-to-data), or leverage relational operator- and data-properties to optimize the ML part of the query (data-to-model). In some implementations, these cross-IR optimizations can be seen as a form of Sideways Information Passing (SIP). However, unlike SIP that requires adapting physical operators, the techniques can be applied purely at query optimization time.

For purposes of explanation and not limitation, several cross-IR optimizations are discussed. (1) Predicate-based model pruning. This data-to-model optimization can exploit predicates in the UIR (e.g., coming from the WHERE clause of the SQL query or a Pandas' filter) to simplify a model.

In the example discussed above relative to FIG. 2, the filter pregnant=1 can be propagated to the downstream decision tree model. The right branch of the tree can then be eliminated, thereby improving its prediction time.

In some implementations, predicate-based pruning can also be beneficial for categorical features. Such features are typically encoded as a set of binary features, one for each unique value of the original feature. If there is a selection on the original feature, only one of the corresponding binary features will be non-zero. Hence, the rest of the features can be dropped from the model. Additionally, in some implementations, a neural network's performance can be improved via constant folding (e.g., statically computing part of the model based on the constant input from the predicate).

This technique can also be applied based on data properties instead of explicit selections. Using data statistics, in some examples, it can be observed that only specific unique values appear in the data or that data follows specific distributions (e.g., all patients are above 35). In these cases, predicates can be derived to perform predicate-based pruning.

(2) Model-projection pushdown. In this model-to-data optimization, properties of an ML operator can be observed to simplify the data processing part of the inference query.

Consider a logistic or linear regression model with some of its weights being zero. This can often be the case when L1-regularization techniques are applied during training (e.g., Lasso) to improve the model's generalization ability, size, and prediction cost. In some implementations, this property can be exploited further. The features that will be multiplied with these zero-weights are not useful for the prediction, and can be projected out and removed from the model without affecting the inference result.

In some implementations, model-projection pushdown can be enabled by other optimizations. For example, referring to FIGS. 2 and 3, predicate-based pruning of the right tree branch enables model-projection pushdown on gender, as it is no longer needed. Similarly, it can enable other optimizations: after eliminating features, the relational optimizer can drop joins if one of the joining relations no longer provides features needed by the model.

(3) Model clustering. In some implementations, predicate-based pruning using data properties can be taken a step further. When a single value for one or more features is not found, the data can be clustered in a way that each cluster has specific values for some features. The optimized models can then be precompiled for each cluster.

Operator Transformations

In addition to the logical optimizations discussed above, in some implementations, the system 100 can apply rules that transform (a set of) operator(s) to another set of operators. For example, the system 100 can map a linear regression to a matrix multiplication. Such transformation(s) enable both additional optimizations and the use of different runtimes for executing an operator (e.g., a high-performance NN engine might not have a dedicated linear regression, but has the lower-level operator it got translated to). Note that transformations should preserve semantics (e.g., SQL's bag semantics vs. Pandas' ordered bags).

Model inlining. These transformations can translate ML operator(s) (LA and MLD operators) to relational operator (s). In some implementations, these transformation(s) can allow the system 100 to use the relational optimizations and high performance of the RDBMS (e.g., SQL Server) for data operations (e.g., a join that was initially expressed in Python). Moreover, the system 100 can employ the UDF in-lining technique (e.g., of SQL Server 2019) to further boost performance.

NN translation. In some implementations, the system 100 can employ transformation(s) from MLD to linear algebra operators. This allows the system 100 to express classical ML operators and data featurizers, typically written in frameworks like scikit-learn and ML.NET, to neural-networks that can be executed in highly efficient engines, for example, ONNX, PyTorch, and TensorFlow. In some implementations, this can be very important performance-wise: unlike most traditional ML frameworks, NN engines support out-of-the-box hardware acceleration through GPUs/FPGAs/NPUs, as well as code generation.

Cross Optimizer

Various transformation rules (cross-optimizations and operator transformations) have been discussed above. In some implementations, some or all of these rules can be integrated into the cross-optimization component 140. In some implementations, the cross-optimization component 140 can be heuristic-based, (e.g., applying all rules in a specific order). In some implementations, a cost-based Cascades-style optimizer can be employed by the cross-optimization component 140. In some implementations, the cross-optimization component 140 can be integrated with an optimizer of the DBMS/RDBMS, in which each operator will be associated with a cost. Several plan alternatives can be considered by applying the rules in different orders and the best is selected. Note that as part of the optimization process, the cross-optimization component 140 can select/determine the runtime that each operator will be executed in (e.g., relational engine 150 or ML runtime 160 in one configuration, or data engine 194 or ML runtime 160 in another configuration), based, for example, on each runtime's capabilities and performance (including specialized hardware), and/or the cost of switching across engines. In some implementations, the output of the cross-optimization component 140 is a new more optimized version of the UIR. In some implementations, a heuristic-based and/or cost-based optimization technique can be employed by the cross-optimization component 140 to select which is the best UIR to then be executed by the data/relational engine and the ML runtime (e.g., engine).

Inference Query Execution

The code generator 164 can build a new query (e.g., SQL query) that corresponds to the optimized UIR (e.g., the output of the cross-optimization component 140). The model invocations that are included in the optimized query can be executed in one of the following ways (e.g., in decreasing level of integration with the relational engine 150 of the RDBMS or the data engine 194):

In-process execution. In some implementations, the RDBMS can include a statement to allow native inference for a small set of models. The ML runtime 160 can be integrated with the RDBMS (e.g., within SQL Server). The ML runtime 160 can be used as a dynamically linked library to create inference sessions, transform data to tensors, and/or invoke in-process predictions over any model, such as the ONNX, TensorFlow, or PyTorch models, for instance, of the system 100. In this example, a user simply can store their model in SQL Server and issue queries that include model inference using the existing statement. This tends to be the tightest-integration option: apart from in-process execution, it also allows the system 100 to take advantage of model and inference-session caching, and/or SQL Server's optimizer.

Out-of-process execution (extension). For models that in-process execution that is not supported by the static analyzer component 130, an "sp_execute_external_script" statement, can be utilized which instantiates an external language runtime to perform out-of-process inference. Note that this script implementation detail is provided for purposes of explanation, and other scripts are contemplated.

Containerized execution. For model pipelines that cannot be executed with one of the above techniques the system 100 can spin up a docker container and perform inference through a REST endpoint.

The system 100 can thus perform in-database ML inference. In some implementations, the system 100 can perform static analysis of Python ML pipelines and SQL queries, that are captured in a UIR. This can enable the system 100 to apply cross-optimizations, yielding performance gains. For example, the target execution environment for this OUIR can be a deeply integrated version of SQL Server and a Runtime, which alone provides performance gains over standalone Runtime execution. For example, the Runtime can be ONNX Runtime, among others.

In some implementations, the system 100 does not perform static analysis and/or cross-optimization. That is, the inference query can be executed by a stand-alone inference engine integrated in the same process as the relational engine. In this manner, performance improvements can be obtained as (1) overhead associated with calling an engine externally is reduced, and/or (2) RDBMS (e.g., SQL Server) optimization(s) can be utilized to improve execution of the inference query. For example, the RDBMS (e.g., SQL Server) can parallelize the plan when calling the ML runtime engine, even if no cross-optimization(s) are performed. Thus, by integrating an external ML inference engine into a relational engine, performance improvements can be achieved.

Figure 4:
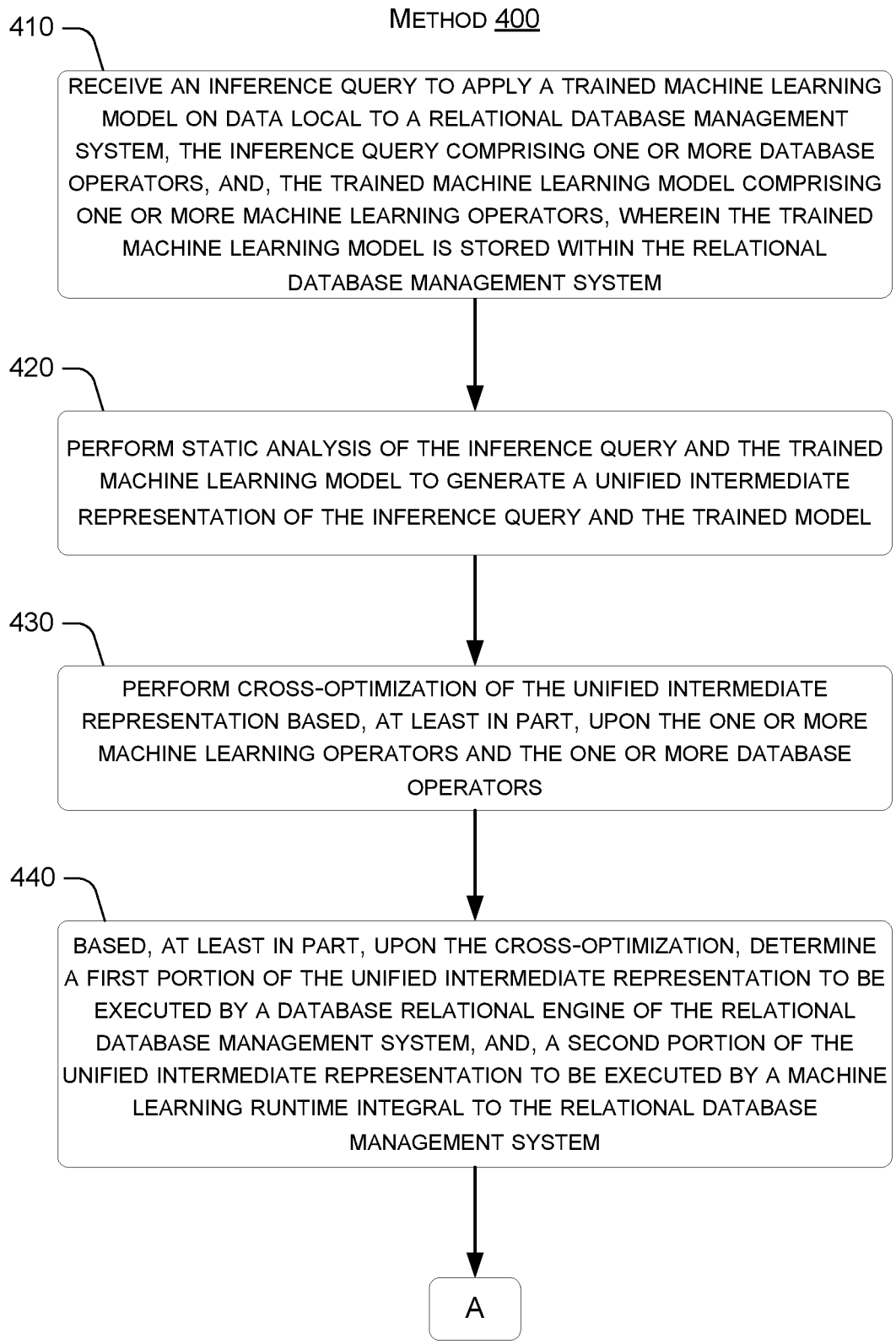
FIGS. 4-6 are flow charts that illustrate example methods of executing inference queries in accordance with some implementations of the present concepts.
Figure 5:
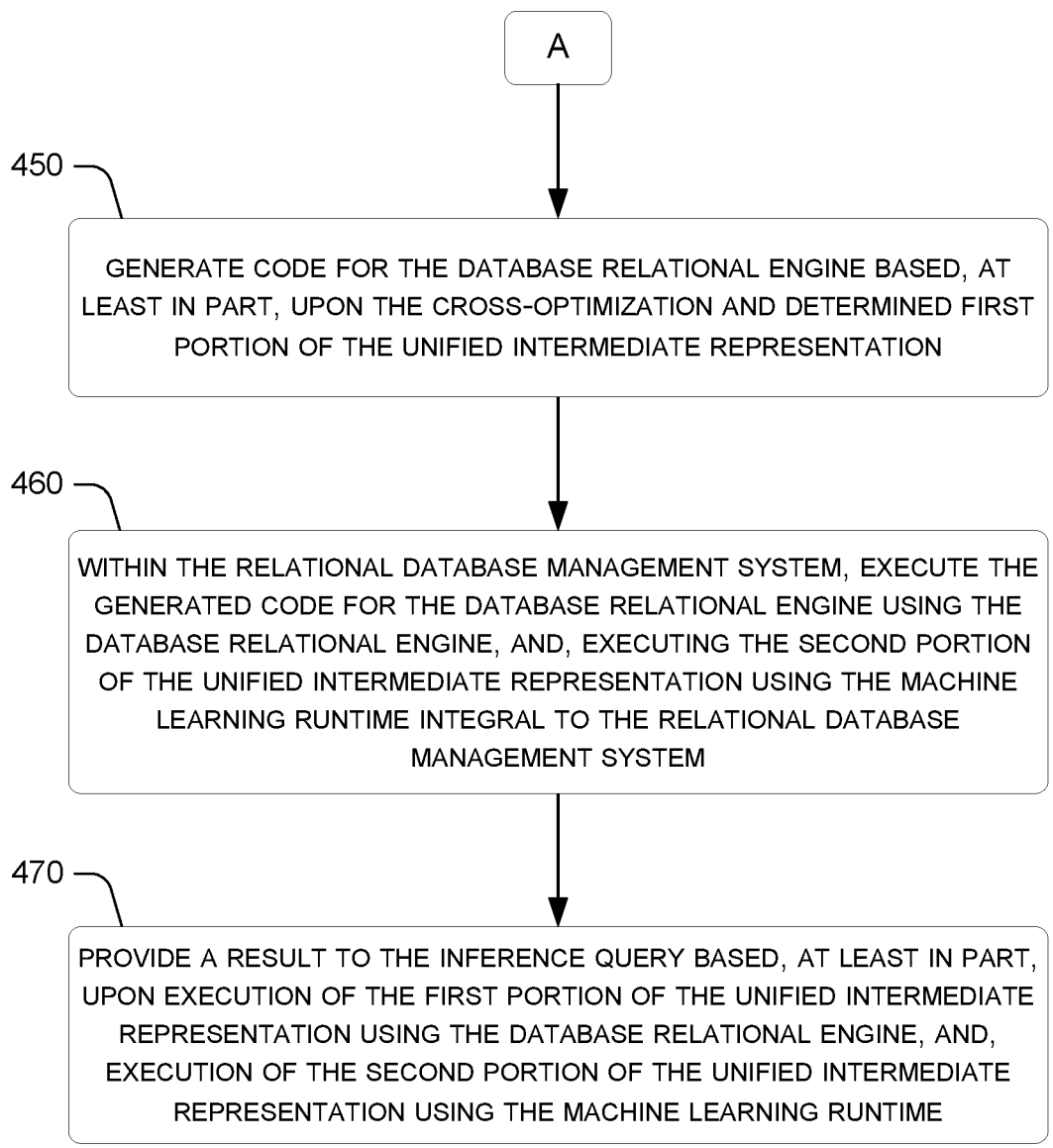

FIGS. 4 and 5 illustrate example methodologies relating to executing an inference query within a database management system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media (e.g., computer storage medium/media). The computer-executable instructions can include a routine, a sub-routine, programs, a thread of execution, and/or the like. Still further, results of acts of the methodologies can be stored in a computer-readable medium, displayed on a display device, and/or the like.

Referring to FIGS. 4 and 5, a method 400 of executing an inference query within a relational database management system is illustrated. In some implementations, the method 400 is performed by the system 100, for example.

At 410, the method can involve receiving the inference query to apply a trained machine learning model on data local to the relational database management system. The inference query can include one or more database operators, and, the trained machine learning model can include one or more machine learning operators. In some implementations, the trained machine learning model is stored within the relational database management system. Such a configuration is illustrated relative to FIG. 1A. In other case, the database management system can access the trained machine learning model. Such examples are shown in FIGS. 1B and 1C, for instance.

At 420, analysis of the inference query and the trained machine learning model is performed to generate a unified intermediate representation (UIR) of the inference query and the trained model. In some cases, the trained machine learning model can be in a form that readily lends itself to generating the UIR. In other cases, static analysis and/or other techniques can be performed to generate the UIR. At 430, cross-optimization of the unified intermediate representation is performed based, at least in part, upon the one or more machine learning operators and the one or more database operators.

At 440, based, at least in part, upon the cross-optimization, a first portion of the unified intermediate representation to be executed by a database relational engine of the relational database management system, and, a second portion of the unified intermediate representation to be executed by a machine learning runtime integral to the relational database management system are determined. At 450, code for the database relational engine is generated based, at least in part, upon the cross-optimization and the determined first portion of the unified intermediate representation.

At 460, within the relational database management system, the generated code for the database relational engine is executed using the database relational engine, and, the second portion of the unified intermediate representation is executed using the machine learning runtime integral to the relational database management system. At 470, a result to the inference query is provided based, at least in part, upon execution of the first portion of the unified intermediate representation using the database relational engine, and, execution of the second portion of the unified intermediate representation using the machine learning runtime.

Figure 6:
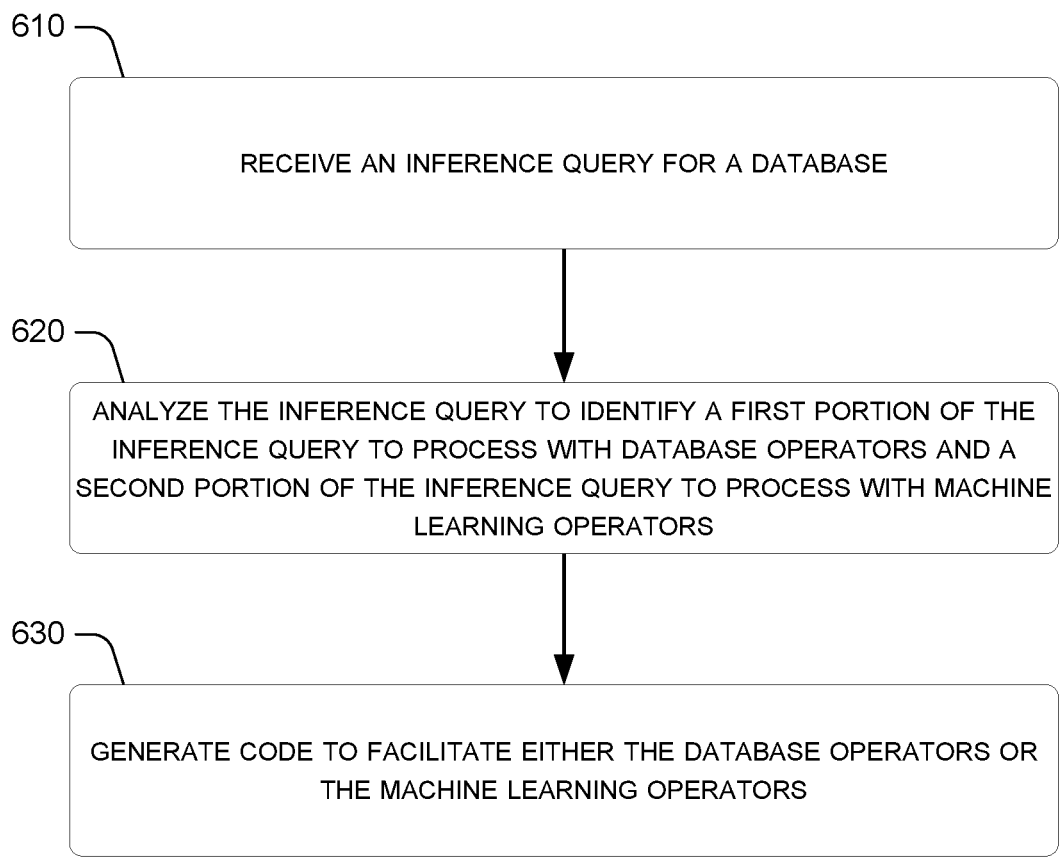

FIG. 6 shows another method 600 for obtaining results for an inference query.

At 610, the method can receive an inference query for a database. In some cases, the inference query can be received at an input component of a database management system. In other cases, the inference query can be received from an intermediary.

At 620, the method can analyze the inference query to identify a first portion of the inference query to process with database operators and a second portion of the inference query to process with machine learning operators. In some cases, the analyzing can entail accessing a trained machine learning model. In some configurations, the trained machine learning model can be local to a component performing the analyzing. In other configurations, the machine learning model can be remote from the component performing the analyzing. In some case, the accessing can entail obtaining machine learning operators from the trained machine learning model or relating to the machine learning model.

In some implementations the analyzing can entail generating a unified intermediate representation of the inference query and the trained machine learning model. The analyzing can further entail cross-optimizing the unified intermediate representation to generate an optimized unified intermediate representation. In some cases the cross-optimizing can entail passing information between the data operators and the ML operators. Alternatively or additionally, the cross-optimizing can entail predicate-based model pruning, model projection pushdown, model/query splitting, model in-lining, and/or neural network translation, among others.

At 630, the method can generate code to facilitate either the database operators and/or the machine learning operators. This code can facilitate efficient processing of the inference query using less resources than previous techniques that obtain results solely using database operators. The results can be used for various purposes, such as to provide useful information to the user and/or to control various devices, among others.

Figure 7:
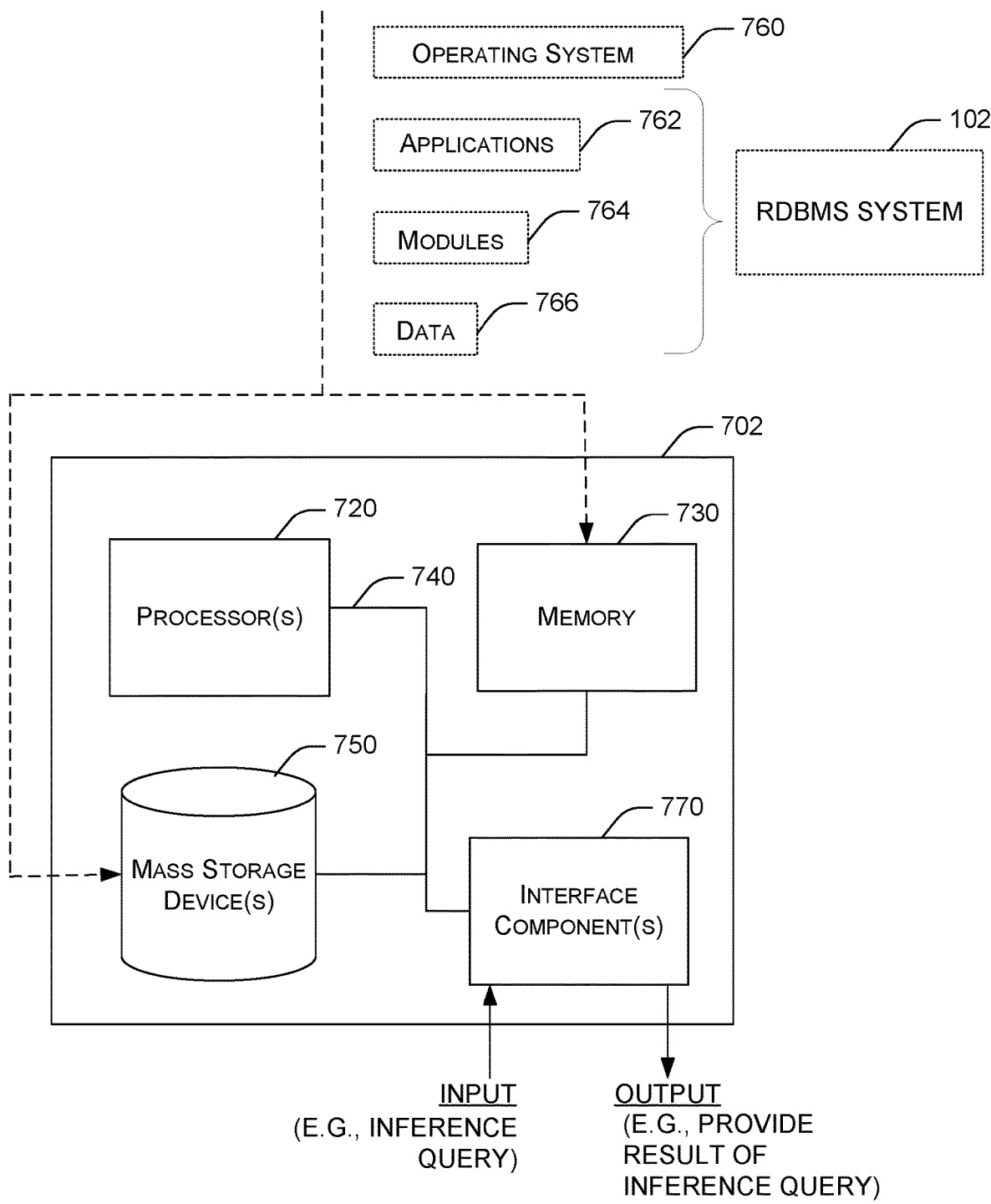
FIG. 7 is a functional block diagram that illustrates an example computing system in accordance with some implementations of the present concepts.

With reference to FIG. 7, illustrated is an example general-purpose computer, processing system, or computing device 702 (e.g., mobile phone, desktop, laptop, tablet, watch, server, hand-held, programmable consumer or industrial electronics, set-top box, game system, compute node, etc.). For instance, the computing device 702 may be used in a system (100A, FIG. 1A) for executing an inference query within a relational database management system (102, FIG. 1A) or other database management system (192, FIG. 1D).

The computer 702 can include one or more processor(s) 720, memory 730, system bus 740, mass storage device(s) 750, and/or one or more interface components 770. The system bus 740 communicatively couples at least the above system constituents. However, it is to be appreciated that in its simplest form the computer 702 can include one or more processors 720 coupled to memory 730 that execute various computer executable actions, instructions, and/or components stored in memory 730. The instructions may be, for instance, instructions for implementing functionality described as being carried out by one or more components discussed above or instructions for implementing one or more of the methods described above.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one implementation, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media (e.g., computer-readable storage media) and communication media.

Computer storage media includes volatile and nonvolatile, removable and non-removable media that stores information, such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like media that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of the computing device, memory 730 may be volatile (e.g., RAM), non-volatile (e.g., ROM, flash memory, etc.) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device (s) 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, RDBMS 102 or portions thereof, can be, or form part, of an application 762, and include one or more modules 764 and data 766 stored in memory 730 and/or mass storage device(s) 750 whose functionality can be realized when executed by one or more processor(s) 720.

In some implementations, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, a SOC implementation of the processor is more powerful, as it embeds hardware and software therein that enable particular functionality with minimal or no reliance on external hardware and software. For example, the RDBMS 102 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g., serial, parallel, PCMCIA, USB, FireWire, etc.) or an interface card (e.g., sound, video, etc.) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 770 can be embodied as an output peripheral interface to supply output to displays (e.g., LCD, LED, plasma, etc.), speakers, printers, and/or other computers, among other things. Still further yet, the interface component 770 can be embodied as a network interface to enable communication with other computing devices (not shown), such as over a wired or wireless communications link.

As used herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a processor, a process running on a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

Various examples are described above. Additional examples are described below. One example includes a system comprising a processor and a memory having computer-executable instructions stored thereupon which, when executed by the processor, cause the processor to: receive an inference query to apply a trained machine learning model on data local to a relational database management system, the inference query comprising one or more database operators, and, the trained machine learning model comprising one or more machine learning operators, wherein the trained machine learning model is stored within the relational database management system, perform static analysis of the inference query and the trained machine learning model to generate a unified intermediate representation of the inference query and the trained model, and perform cross-optimization of the unified intermediate representation based, at least in part, upon the one or more machine learning operators and the one or more database operators. The system also comprises based at least in part, upon the cross-optimization, determining a first portion of the unified intermediate representation to be executed by a database relational engine of the relational database management system, and, a second portion of the unified intermediate representation to be executed by a machine learning runtime integral to the relational database management system, generate code for the database relational engine based, at least in part, upon the cross-optimization and the determined first portion of the unified intermediate representation, within the relational database management system, execute the generated code for the database relational engine using the database relational engine, and, execute the second portion of the unified intermediate representation using the machine learning runtime integral to the relational database management system, and provide a result to the inference query based, at least in part, upon execution of the first portion of the unified intermediate representation using the database relational engine, and, execution of the second portion of the unified intermediate representation using the machine learning runtime.

Another example includes a system comprising a processor and a memory having computer-executable instructions stored thereupon which, when executed by the processor, cause the processor to: receive an inference query for a database, analyze the inference query to identify a first portion of the inference query to process with database operators and a second portion of the inference query to process with machine learning operators, process the first portion with the database operators, process the second portion with the machine learning operators, and generate a result for the inference query based at least in part upon output of the first portion processed by the database operators and the second portion processed by the machine learning operators.

Another example can include any of the above and/or below examples where the system further comprises a trained machine learning model that relates to the machine learning operators.

Another example can include any of the above and/or below examples where the processor is configured to perform static analysis of the inference query and the trained machine learning model to generate a unified intermediate representation of the inference query and the trained machine learning model.

Another example can include any of the above and/or below examples where the processor is configured to perform cross-optimization of the unified intermediate representation based, at least in part, upon the one or more machine learning operators and the one or more database operators.

Another example can include any of the above and/or below examples where the processor is configured to determine the first portion and the second portion from the optimized unified intermediate representation.

Another example can include any of the above and/or below examples where the processor is configured to generate code for at least one of the first portion or the second portion.

Another example can include any of the above and/or below examples where the processor is configured to generate code comprising a new machine learning model for the second portion.

Another example can include any of the above and/or below examples where the system further comprises a database management system (DBMS) that includes the database.

Another example can include any of the above and/or below examples where the DBMS comprises a relational database management system (RDBMS) and the database comprises a relational database.

Another example can include any of the above and/or below examples where the database comprises a non-relational database.

Another example can include any of the above and/or below examples where the processor is configured to communicate with a database management system (DBMS) that includes the database to obtain data for processing by the first portion and/or the second portion.

Another example includes a device implemented method comprising receiving an inference query for a database, analyzing the inference query to identify a first portion of the inference query to process with database operators and a second portion of the inference query to process with machine learning operators, and generating code to facilitate either the database operators or the machine learning operators.

Another example can include any of the above and/or below examples where the receiving comprises receiving at an input component of a database management system.

Another example can include any of the above and/or below examples where the analyzing comprises accessing a trained machine learning model.

Another example can include any of the above and/or below examples where the accessing comprises obtaining the machine learning operators from the trained machine learning model.

Another example can include any of the above and/or below examples where the analyzing comprises generating a unified intermediate representation of the inference query and the trained machine learning model.

Another example can include any of the above and/or below examples where the analyzing comprises cross-optimizing the unified intermediate representation.

Another example can include any of the above and/or below examples where the cross-optimizing comprises passing information between the data operators and the machine learning operators.

Another example can include any of the above and/or below examples where the cross-optimizing comprises predicate-based model pruning, model projection pushdown, model/query splitting, model in-lining, and/or neural network translation.

Another example can include any of the above and/or below examples where the analyzing comprises performing static analysis or wherein the analyzing does not comprise performing static analysis.

Another example includes a database management system comprising a static analysis component configured to receive an inference query that includes one or more database operators and to access a trained machine learning model that includes one or more machine learning operators to generate a unified intermediate representation that reflects the inference query and the trained machine learning model, a cross-optimization component configured to cross-optimize the unified intermediate representation based, at least in part, upon the one or more machine learning operators and the one or more database operators, and a code generator component configured to utilize the cross-optimized unified intermediate representation to determine a first portion of the unified intermediate representation and a second portion of the unified intermediate representation. The database management system also comprises a database engine configured to execute the first portion, a machine learning engine configured to execute the second portion, and an output component configured to generate a result for the inference query from the executed first and second portions.

Another example includes a method for executing an inference query within a relational database management system, comprising receiving the inference query to apply a trained machine learning model on data local to the relational database management system, the query comprising one or more database operators, and, the trained machine learning model comprising one or more machine learning operators, wherein the trained machine learning model is stored within a relational database management system, performing static analysis of the query and the trained machine learning model to generate a unified intermediate representation of the query and the trained model, performing cross-optimization of the unified intermediate representation based, at least in part, upon the one or more machine learning operators and the one or more database operators, and based, at least in part, upon the cross-optimization, determining a first portion of the unified intermediate representation to be executed by a database relational engine of the relational database management system, and, a second portion of the unified intermediate representation to be executed by a machine learning runtime integral to the relational database management system. The method for executing an inference query within a relational database management system also comprises generating code for the database relational engine based, at least in part, upon the cross-optimization and determined first portion of the unified intermediate representation, within the relational database management system, executing the generated code for the database relational engine using the database relational engine, and, executing the second portion of the unified intermediate representation using the machine learning runtime integral to the relational database management system, and providing a result to the inference query based, at least in part, upon execution of the first portion of the unified intermediate representation using the database relational engine, and, execution of the second portion of the unified intermediate representation using the machine learning runtime.

Another example includes a computer storage medium storing computer-readable instructions that when executed cause a processing system to receive an inference query to apply a trained machine learning model on data local to a relational database management system, the inference query comprising one or more database operators, and, the trained machine learning model comprising one or more machine learning operators, wherein the trained machine learning model is stored within the relational database management system, perform analysis of the inference query and the trained machine learning model to generate a unified intermediate representation of the inference query and the trained model, perform cross-optimization of the unified intermediate representation based, at least in part, upon the one or more machine learning operators and the one or more database operators, and based, at least in part, upon the cross-optimization, determine a first portion of the unified intermediate representation to be executed by a database relational engine of the relational database management system, and, a second portion of the unified intermediate representation to be executed by a machine learning runtime integral to the relational database management system. The computer storage medium storing computer-readable instructions that when executed can also cause the processing system to generate code for the database relational engine based, at least in part, upon the cross-optimization and determined first portion of the unified intermediate representation, within the relational database management system, execute the generated code for the database relational engine using the database relational engine, and, execute the second portion of the unified intermediate representation using the machine learning runtime integral to the relational database management system, and provide a result to the inference query based, at least in part, upon execution of the first portion of the unified intermediate representation using the database relational engine, and, execution of the second portion of the unified intermediate representation using the machine learning runtime.

Another example includes a relational database management system comprising a relational engine configured to process a portion of an inference query with data operators and a machine learning engine in data communicating relation with the relational engine and configured to process another portion of the inference query with machine learning operators.

The invention claimed is:

1. A system, comprising:
a processor and a memory having computer-executable instructions stored thereupon which, when executed by the processor, cause the processor to:
receive an inference query to apply on data local to a relational database management system, the inference query comprising one or more database operators and one or more machine learning operators relating to a decision tree;
perform static analysis of the inference query and the decision tree to generate a unified intermediate representation of the inference query;
perform cross-optimization of the unified intermediate representation based, at least in part, upon the one or more machine learning operators and the one or more database operators, the cross-optimization involving pruning the decision tree based at least in part on a particular database operator of the inference query specifying a where condition;
based, at least in part, upon the cross-optimization, determine a first portion of the unified intermediate representation to be executed by a database relational engine of the relational database management system, and, a second portion of the unified intermediate representation to be executed by a machine learning runtime integral to the relational database management system;
generate code for the database relational engine based, at least in part, upon the cross-optimization and the first portion of the unified intermediate representation;
within the relational database management system, execute the generated code for the database relational engine using the database relational engine, and, execute the second portion of the unified intermediate representation using the machine learning runtime integral to the relational database management system; and
provide a result to the inference query based, at least in part, upon execution of the first portion of the unified intermediate representation using the database relational engine, and, execution of the second portion of the unified intermediate representation using the machine learning runtime.

2. A system, comprising:
a processor and a memory having computer-executable instructions stored thereupon which, when executed by the processor, cause the processor to:
receive an inference query for a database having a database relational engine and an integral machine learning runtime;
analyze the inference query to identify a first portion of the inference query to process with one or more database operators using the database relational engine and a second portion of the inference query to process with one or more machine learning operators using the integral machine learning runtime;
perform static analysis of the inference query and a decision tree to generate a unified intermediate representation of the inference query;
perform cross-optimization of the unified intermediate representation based, at least in part, upon the one or more machine learning operators or the one or more database operators, the cross-optimization involving pruning the decision tree based at least in part on a particular database operator of the inference query specifying a where condition; and,
generate a result for the inference query by executing code that is based at least in part on the cross-optimization, the result being based at least in part upon output of the first portion processed using the database relational engine and output of the second portion processed using the integral machine learning runtime.

3. The system of claim 2, wherein computer-executable instructions, when executed by the processor, cause the processor to:
generate the code based at least in part on the first portion and the second portion.

4. The system of claim 3, wherein the database is provided by a relational database management system and the decision tree is stored within the relational database management system.

5. The system of claim 2, wherein the computer-executable instructions, when executed by the processor, cause the processor to:
determine the first portion and the second portion after cross-optimization of the unified intermediate representation.

6. The system of claim 5, wherein the computer-executable instructions, when executed by the processor, cause the processor to:
generate the code from an existing library for at least one of the first portion or the second portion.

7. The system of claim 2, wherein the system further comprises a database management system (DBMS) that includes the database.

8. The system of claim 7, wherein the DBMS comprises a relational database management system (RDBMS) and the database comprises a relational database.

9. The system of claim 7, wherein the database comprises a non-relational database.

10. The system of claim 5, wherein the computer-executable instructions, when executed by the processor, cause the processor to:
communicate with a database management system (DBMS) that includes the database to obtain data for processing by the first portion and/or the second portion.

11. A device-implemented method, comprising:
receiving an inference query for a database having a database relational engine and an integral machine learning runtime;
analyzing the inference query to identify a first portion of the inference query to process with one or more database operators using the database relational engine and a second portion of the inference query to process with one or more machine learning operators using the integral machine learning runtime, the one or more machine learning operators relating to a decision tree;
performing static analysis of the inference query and the decision tree to generate a unified intermediate representation of the inference query;
performing cross-optimization of the unified intermediate representation based, at least in part, upon the one or more machine learning operators or the one or more database operators, the cross-optimization involving pruning the decision tree based at least in part on a particular database operator of the inference query specifying a where condition; and
generating code for the database based at least in part on the cross-optimization,
wherein when executed, the code produces a result of the inference query using first output of the first portion and second output of the second portion, the first output being generated by the database relational engine and the second output being generated by the integral machine learning runtime.

12. The device-implemented method of claim 11, wherein the receiving comprises receiving at an input component of a database management system.

13. The device-implemented method of claim 12, wherein the analyzing comprises accessing the decision tree stored in the database management system.

14. The device-implemented method of claim 13, wherein the accessing comprises obtaining the one or more machine learning operators from the decision tree.

15. The device-implemented method of claim 11, wherein the analyzing comprises performing cross-optimization of the unified intermediate representation based, at least in part, upon the one or more machine learning operators and the one or more database operators.

16. The device-implemented method of claim 15, wherein the cross-optimization comprises passing information between the one or more database operators and the one or more machine learning operators.

17. The device-implemented method of claim 15, wherein the pruning involves selecting a particular subtree for which the where condition is not true and pruning the particular subtree from the decision tree.

18. The device-implemented method of claim 17, wherein the code executes a pruned decision tree that remains after pruning the particular subtree.

19. The device-implemented method of claim 18, wherein the inference query includes at least one other where condition.

20. The device-implemented method of claim 18, wherein the code employs the pruned decision tree to predict a duration of an event for database records that match the where condition.

\* \* \* \* \*